(12) United States Patent
Ott

(10) Patent No.: US 8,365,422 B1
(45) Date of Patent: Feb. 5, 2013

(54) TRU-HITCHIN USING DUAL BEAM TECHNOLOGY AND TRIANGULATION

(76) Inventor: Charles Lawrence Ott, Germantown, TN (US)

( * ) Notice: Subject to any disclaimer, the term of this patent is extended or adjusted under 35 U.S.C. 154(b) by 0 days.

(21) Appl. No.: 13/374,646

(22) Filed: Jan. 5, 2012

(51) Int. Cl.
*B60D 1/36* (2006.01)
(52) U.S. Cl. ............................................. 33/264; 33/286
(58) Field of Classification Search ................ 33/264
See application file for complete search history.

(56) References Cited

U.S. PATENT DOCUMENTS

| | | | |
|---|---|---|---|
| 4,852,901 A * | 8/1989 | Beasley et al. ................. | 280/477 |
| 4,938,495 A * | 7/1990 | Beasley et al. ................. | 33/264 |
| 5,657,175 A * | 8/1997 | Brewington ..................... | 33/264 |
| 5,970,619 A * | 10/1999 | Wells .............................. | 33/264 |
| 6,120,052 A * | 9/2000 | Capik et al. .................... | 280/477 |
| 6,480,104 B1 * | 11/2002 | Wall et al. ....................... | 33/286 |
| 7,354,057 B2 * | 4/2008 | Milner et al. ................... | 280/477 |
| 2006/0267745 A1 * | 11/2006 | Larson ............................ | 340/431 |
| 2007/0137053 A1 * | 6/2007 | Ball ................................. | 33/286 |
| 2007/0159310 A1 * | 7/2007 | Ball ................................. | 33/286 |
| 2007/0216136 A1 * | 9/2007 | Dietz .............................. | 280/477 |
| 2008/0180526 A1 * | 7/2008 | Trevino .......................... | 348/148 |
| 2010/0207358 A1 * | 8/2010 | Ryder ............................. | 280/477 |
| 2011/0216199 A1 * | 9/2011 | Trevino et al. ................. | 33/264 |

* cited by examiner

*Primary Examiner* — Yaritza Guadalupe-McCall

(57) ABSTRACT

The problems of hitching are typically focused on the alignment of the mating components. As a result, assist products tend to offer fragmented solutions and lack universal appeal in the marketplace. The Tru-Hitchin Model using Dual Beam Technology and Triangulation develops a Spatial Triangle with the aid of hardware, as a framework for positioning and alignment of any mating components. The Model transforms two dimensional vehicle movements into a 3rd dimensional beam movement for operator viewing. The operation requires a one-time initialization after which all future hitching is performed safely by one operator with ordinary parking skills. Alignment is complete when the dual functional laser beams are on selected pivot points.

5 Claims, 4 Drawing Sheets

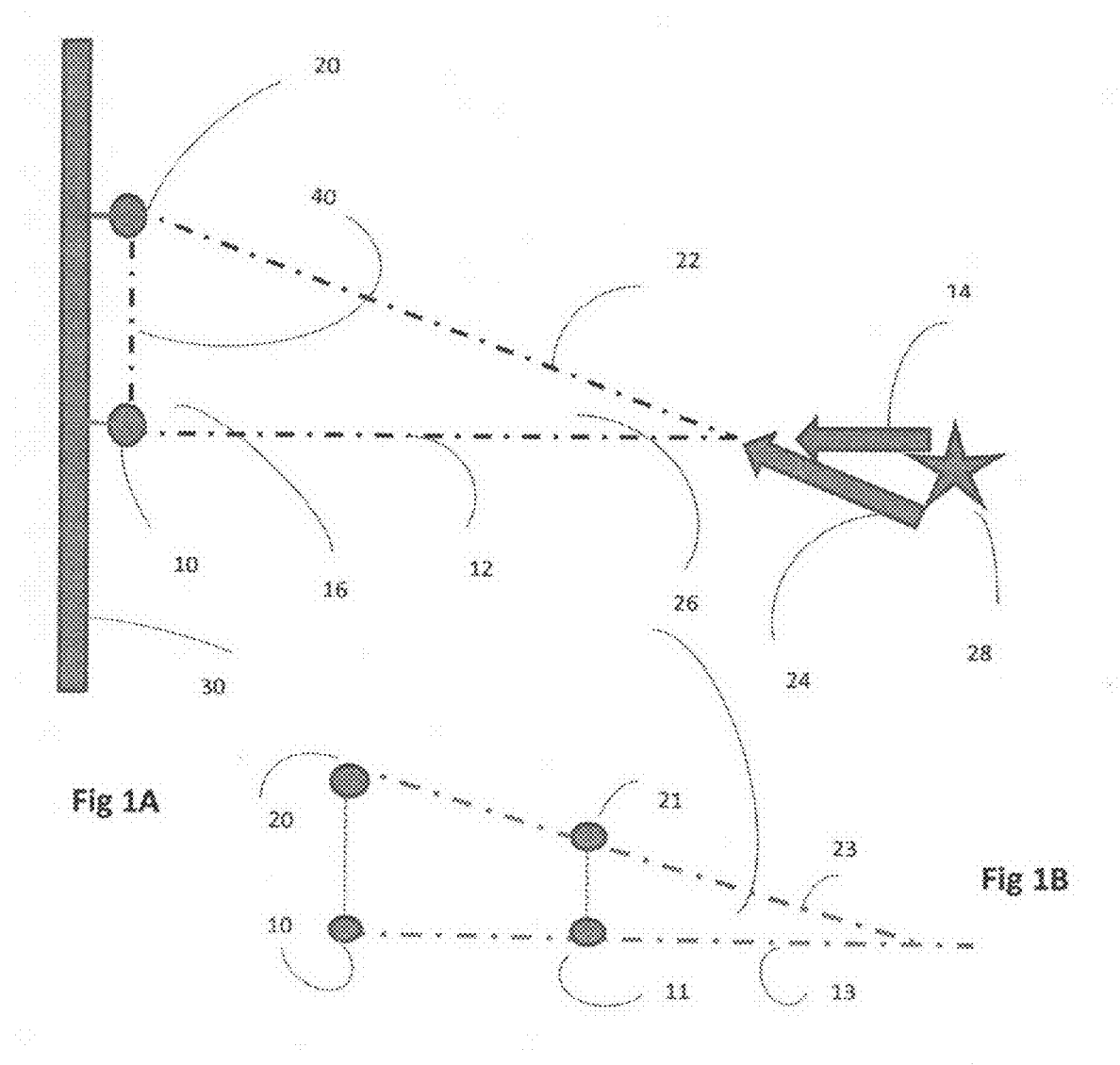

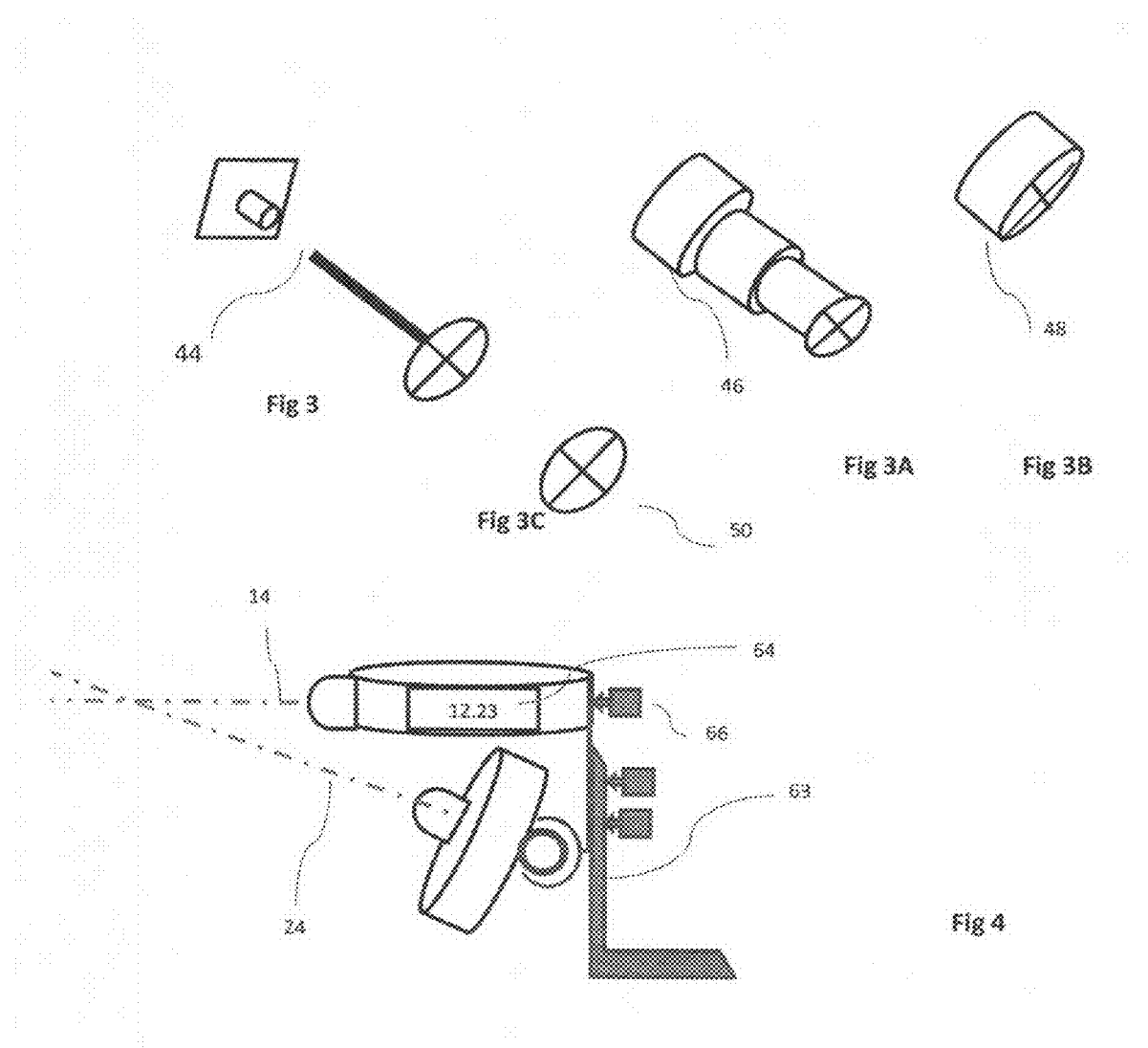

TRU-HITCHIN USING DUAL BEAM TECHNOLOGY AND TRIANGULATION

BACKGROUND

After reviewing prior art and other readings I have found that efforts to solve hitching problems tend to focus on the alignment of mating components. This results in a set of piecemeal solutions with minimal regard for ease of use, safety, cost, and service for the types of assist products on the market.

DESCRIPTION

Tru-Hitchin using Dual Beam Technology and Triangulation has the capability to structure a model and use customized hardware to create a framework for positioning vehicles and aligning mating components. Modeling is a useful tool to simulate the real world and can be used to develop a virtual hitching environment. This is done with Dual Beams, pivot points, and a virtual plane to create a Spatial Triangle in 3D that is visible to the operator. The Beam Technology being used has dual functionality being both a visible light laser and a distance measuring tool. The tool provides a secondary check for accurate alignment. A one-time setup with the vehicles already hitched is required to initialize the angle between the dual beams and placement of a pivot point determined by Triangulation. The hitching operation simply involves a driver with ordinary parking skills to maneuver the vehicle, such that, the Dual Beams are centered on their respective pivot points. The car is now positioned for alignment and the mating components can be joined.

Detail Description—Spatial Triangle

An example of a motorhome hitched to a tow car in FIG. 1 will demonstrate the use of the Model, the one-time initialization, and the geometry of positioning for alignment under real world constraints. The back of the Motorhome will be defined as a physical plane [30] and a few inches behind it is a virtual plane [40] bisecting the ball or coupling on the mating components [42]. A Spatial Triangle is created by Dual Beams [28] projected from the tow car with side1 [12] formed by Beam1 [14] and side2 [22] formed by Beam2 [24] at angle a [26]. Side3 is formed by the Beams intersecting the virtual plane [40] at pivot point1 PP1 [10] and pivot point2 PP2 [20] respectively in FIG. 1A. Consider the orientation of the right triangle and angle a [26] between the Beams, specific to this example.

Detail Description—Pivot Points

Pivot points act like the hinges on a door to provide angular motion and are visible to the Operator on the physical plane [30] and also on the virtual plane [40] as Pivot Point Extenders PPE [46] shown in FIG. 3. The required length of the PPE [46] is the distance from the center of the ball [42] on the mating component to the back of the Motorhome [30]. Extenders can be assembled from very light material and placed with adhesive on the back of the motorhome. They can be removable as shown in FIG. 3 or permanent as shown in FIG. 3B

Detail Description—Beam1 Filter

A Filter [18] is needed on Beam1 [14] when it is blocked by a physical plane [30] before placement of PP1 [10] on the virtual plane [40]. An example is the filter [18] mounted on the front of a 5th wheel trailer or back of motorhome selecting only Beams projected on a line to PP1 [10] in the virtual plane [40] as shown in FIG. 2. A Filter [18] is made by cutting angled slots into suitable material with radius from ball [42] to back of motorhome [30]. The calculation for placement of PP2 [20] is now based on a similar Triangle [12] on the physical plane [30]. A similar triangle has the same shape but is a different size.

Detail Description—One-Time Initialization

The one-time Initialization process starts with the car hitched in line with the motorhome on a relatively flat surface. With Beam1 [14] turned on and leveled, PP1 [10] or PP1E [44] is placed on the back of the motorhome [30]. The placement of PP2 [20] is calculated by Triangulation [Table 1] as the distance from PP1 [10] with fixed angle a [26]. Modeling with variable angle a provides a series of optional placements of PP2 [20] to gauge alignment accuracy.

Detail Description—Triangulation

Using Triangulation, the distance to a point can be found knowing two angles and the length of the side between them. Side1 [12] distance is known from Beam1 [64] laser measuring Technology, angle b=90 degrees [16], and angle a [26] can vary approximately 10 to 80 degrees [Table 2].

TABLE 1

Trigonometric Ratios

| Degrees | Tangent | Degrees | Tangent | Degrees | Tangent | Degrees | Tangent |
|---|---|---|---|---|---|---|---|
| 10 | 0.173 | 30 | 0.5774 | 45 | 1.0 | 60 | 1.7321 |
| 20 | 0.364 | 40 | 0.8391 | 50 | 1.1918 | 70 | 2.7475 |
|  |  |  |  |  |  | 80 | 5.6713 |

TABLE 2

Trigonometric Formula

Formula to find distance of $3^{rd}$ point of triangle if 2 angles are known and the side between them is known.

EXAMPLE

Angle b=90 degrees
Side 3=Side 1 multiplied by Tan a
Chart above for 45 degrees is 1
If angle a is assumed to be 45 degrees,
PP2 distance from PP1 is same as side 1.

TABLE 3 of Parts

| | |
|---|---|
| 10 | Pivot Point1 PP1 |
| 11 | PP1 of Similar Triangle |
| 12 | Spatial Triangle - Side1 |
| 13 | Similar Triangle - Side1 |
| 14 | Beam1 |
| 16 | Angle b |
| 18 | Beam1 Filter - Top View |
| 19 | Beam1 Filter - Front View |
| 20 | Pivot Point2 PP2 |
| 21 | Similar Triangle - PP2 |
| 22 | Spatial Triangle - Side 2 |
| 23 | Similar Triangle - Side2 |
| 24 | Beam2 |
| 26 | Angle a |
| 28 | Dual Functional Beams, Beam mount on car - vehicle 1 |
| 30 | Back of Motorhome - physical plane - vehicle 2 |
| 40 | Virtual Plane |
| 42 | Coupling Ball bisecting Virtual Plane - mating component |
| 44 | Removable Pivot Point Extender PPE |
| 46 | Permanent PPE - Open |
| 48 | Permanent PPE - Closed |
| 50 | Permanent Pivot Point PP |

TABLE 3-continued of Parts

| 63 | Beam2 adjustable bracket |
| 64 | Distance Readout Laser |
| 66 | Rivets |

TABLE OF FIGURES

Description of Drawings

FIG. 1A Spatial Triangle—Virtual Triangle created with Beams in space projected on a plane with parts as defined in the parts table. Once initialized, the shape of the Spatial Triangle remains the same with fixed angle a. The motion of the car appears to change the size of the Spatial Triangle as Beam2 moves vertically on the physical plane.

FIG. 1B Similar Triangle—same shape but not same size, with proportional sides. The Similar Triangle is shown inside of the Spatial Triangle. This occurs when the Filter is used on Beam1 and the placement of Pivot Point2 is calculated with Side1 of the Similar Triangle.

FIG. 2 Front View [19] The filter provides visible Pivot Points [11] on a similar triangle for operator viewing when the virtual plane is behind the physical plane. The five slots allow for five different positions whose beams are aligned with the Pivot Point [10] on the virtual plane [40]. For additional angular motion, more slots can be added. Placement of Similar Triangle PP2 [21] can be derived by Triangulation.

FIG. 3 Removable PPE The base is affixed to the physical plane [30] with or without the Extender [40].

FIG. 3A Permanent PPE—Open The length of PPE [46] is the same length as Extender [44] which is pulled out prior to hitching operation.

FIG. 3B Permanent PPE—Closed PPE [48] is shown pushed in after hitching operation.

FIG. 3C Permanent Pivot Point PP Pivot Point [50] is shown affixed to the physical plane [30] when it is the same as the virtual plane.

FIG. 4 Dual Beams Mount and adjustable Bracket Off the shelf Lasers consist of Beam1 [14] with distance measuring readout [64] and leveling capability. The adjustable bracket [63] on Beam2 [24] permits angle a [26] variance for greater accuracy during initial setup. A vertical offset by Beam1 on PP1 indicates a surface condition different from level conditions at initialization. A vertical adjustment of the beam mount [28] will zero the offset and ensure accuracy of PP2 [20].

OPERATION

Figure 1:
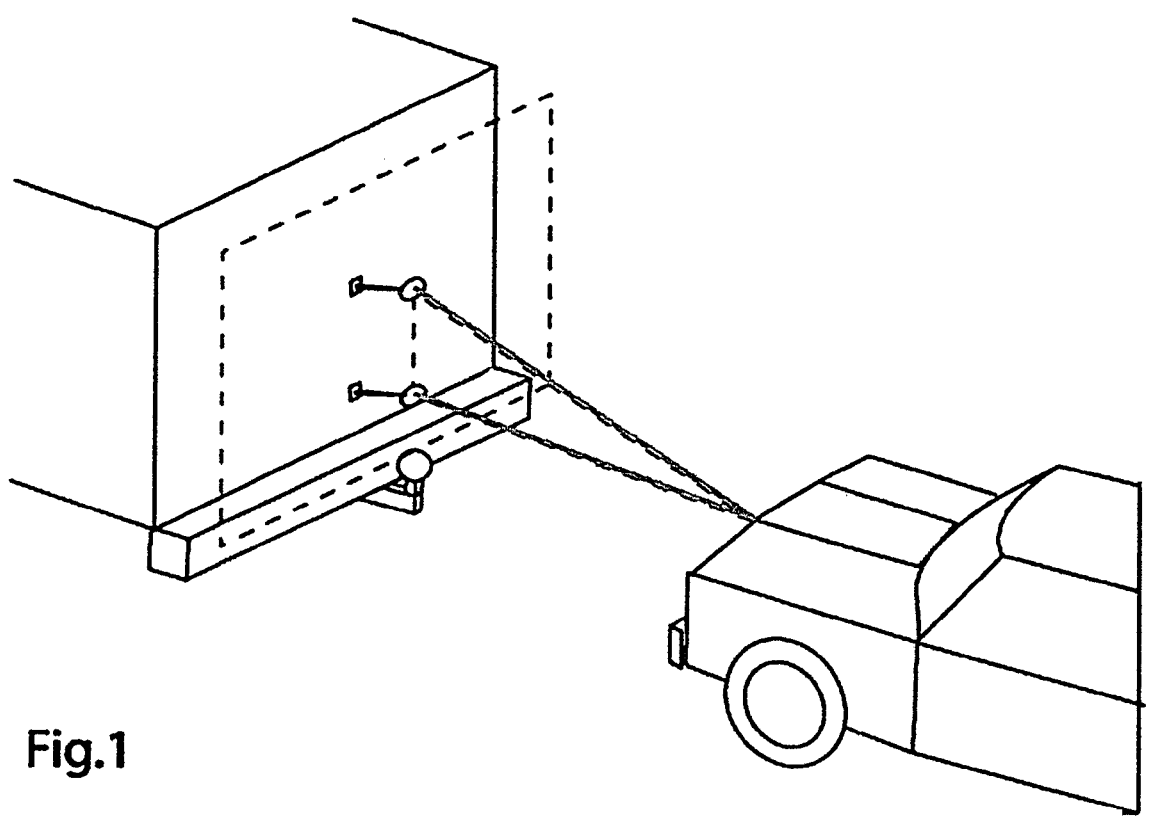
FIG. 1 Overview of Model positioning Motorhome, Car, and Spatial Triangle. The drawing illustrates the essence of the Tru-Hitchin Model, as an example, using Spatial Triangle, Pivot Points, Virtual/Physical Planes, and Dual Functional Laser Beams to position car for hitching alignment.
Figure 2:
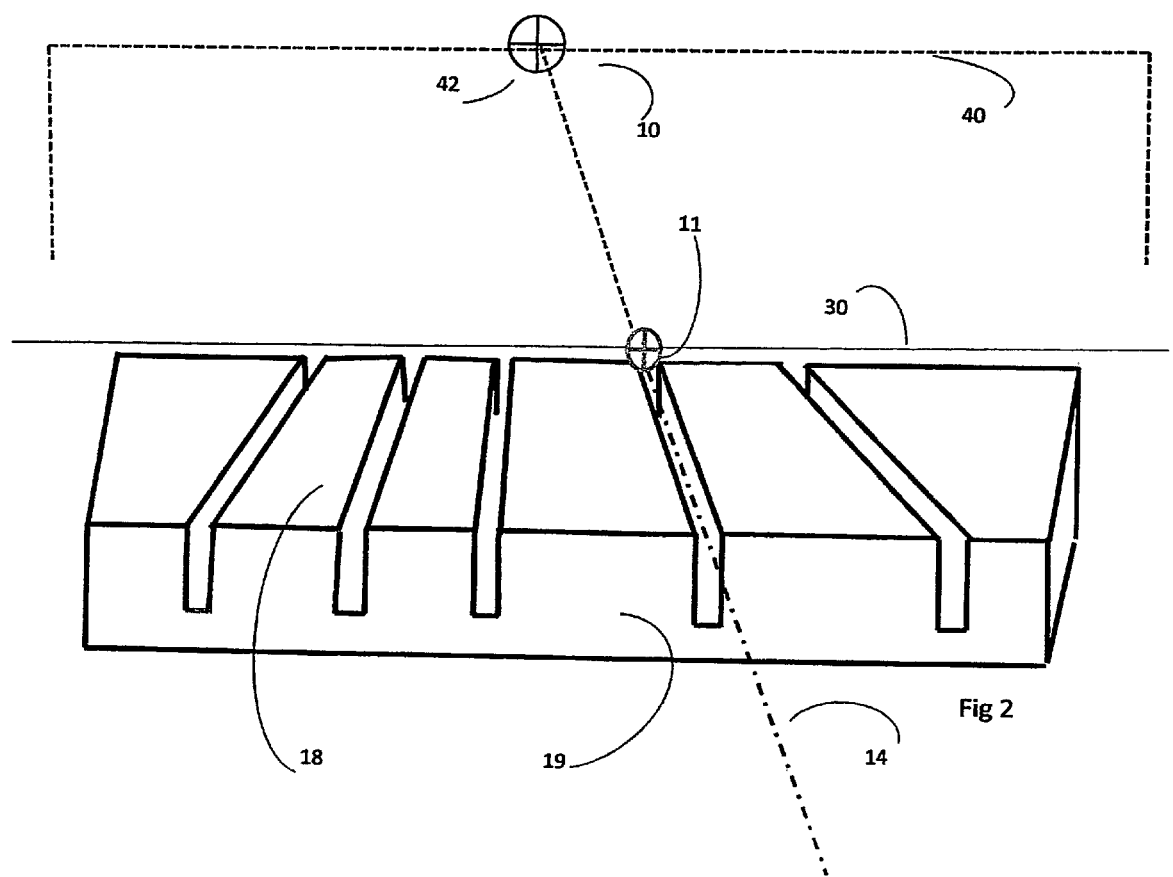
FIG. 2 Filter—Top View[18] Beam1 [14] projected through a slot will be visible on the back of the Motorhome [30] as PP1[11]. Each slot has a separate PP1[11] on the Similar Triangle. If Beam [14] could continue, it would intersect the virtual plane [40] at PP1[10]. This bisecting [42] occurs because both vehicles were coupled during the one-time initialization and placement of the filter.

Vehicle1 controls side to side movement of Beam1 [14] before centering on PP1 [10]. Uneven surface between car and motorhome is indicated by Beam1 [14] vertical offset from initialization on PP1 [10]. Vehicle1 moving forward and back translates to down up movement of Beam2 [24] before centering on PP2 [20]. The car is now positioned for alignment and the mating components [42] can now be joined.

SUMMARY

The Model built around this conceptual framework and custom hardware was developed, tested, and now documented as an embodiment of a universal method of positioning for alignment of mating components. The process is safe and easy to use for an operator with ordinary parking skills. Off the shelf Laser Technology is economical to deploy and has a good track record of service over time.

I claim:

1. A method wherein a laser creating a spatial triangle of directional means on a towing vehicle, an operator viewing said directional means maneuvers said towed vehicle into position for coupling alignment with towing vehicle, comprising;

a structure of laser beams creating directional lines and angles forming a triangle, a one-time setup of both vehicles coupled together on a straight line axis, a dual beam technology laser level mounted on towed vehicle transmitting a visible laser light to a point PP1 on the towing vehicle and measuring the distance to said PP1 in units on a display attached to said laser, a second laser mounted directly below said dual beam technology laser on towed vehicle pointing slightly up transmitting a visible laser light to a point PP2 on the towing vehicle.

2. The method of claim 1 wherein a right triangle formed by sides 1, 2, and 3 as beam1 to PP1, beam2 to PP2, and a line PP1 to PP2 respectively, similar triangle formed inside said right triangle by beam1 to PP1E, beam2 to PP2E and a line PP1E to PP2E, extending said line bisects mating components, target on PP1E and PP2E supported by extension mounted on PP1 and PP2 respectively, distance of beam1 to PP1E measured by said laser means, uncoupling both vehicles completes the one-time setup creating directional means and distance to PP1 and distance to PP1E.

3. The method of claim 1 wherein an operator moving towed vehicle forward, alignment of towed vehicle mating component with the towing vehicle mating component indicated by said level beam1 on PP1E and said angled beam2 on PP2E, uneven surface or vehicle loading corrected by operator adjusting spatial triangle up or down to align beam1 on PP1E, physical connection of mating components completes hitching process.

4. The method of claim 3 further including optional alignment indicated by said level beam1 on PP1E and said laser displaying said distance to PP1E.

5. The method of claim 1 whereby modeling the structure with geometric formulas and laser data, documenting current structure for alignment accuracy, and developing optional placements of mating components on various types of vehicles.

* * * * *